United States Patent
Edry et al.

(10) Patent No.: US 11,595,774 B2
(45) Date of Patent: Feb. 28, 2023

(54) SPATIALIZING AUDIO DATA BASED ON ANALYSIS OF INCOMING AUDIO DATA

(71) Applicant: MICROSOFT TECHNOLOGY LICENSING, LLC, Redmond, WA (US)

(72) Inventors: Philip Andrew Edry, Seattle, WA (US); Todd Ryun Manion, Seattle, WA (US); Robert Norman Heitkamp, Sammamish, WA (US); Steven Marcel Elza Wilssens, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/594,328

(22) Filed: May 12, 2017

(65) Prior Publication Data

US 2018/0332424 A1 Nov. 15, 2018

(51) Int. Cl.
*G06F 17/00* (2019.01)
*H04S 7/00* (2006.01)
(Continued)

(52) U.S. Cl.
CPC .............. *H04S 7/304* (2013.01); *G11B 27/10* (2013.01); *H04S 5/005* (2013.01); *H04S 7/30* (2013.01);
(Continued)

(58) Field of Classification Search
CPC ....... G10L 19/008; G10L 19/20; G10L 19/00; G10L 19/167; H04S 2400/11;
(Continued)

(56) References Cited

U.S. PATENT DOCUMENTS 8,155,971 B2 * 4/2012 Hellmuth ................ G10L 19/04
704/501
9,165,558 B2 10/2015 Dressler et al.
(Continued)

FOREIGN PATENT DOCUMENTS

EP 2154911 A1 2/2010
GB 2353193 A 2/2001
(Continued)

OTHER PUBLICATIONS

"Audio Signal Processing Modes", https://msdn.microsoft.com/windows/hardware/drivers/audio/audio-signal-processing-modes, Published on: Oct. 10, 2016, 15 pages.
(Continued)

*Primary Examiner* — Paul C Mccord
(74) *Attorney, Agent, or Firm* — Seott Y. Shigeta; Newport IP, LLC (57) ABSTRACT

A system for enabling spatializing audio data is provided. The system analyzes audio data to identify when to generate spatialized audio data. The system can receive incoming audio data including a plurality of channel-based audio signals as well as object-based audio. The system performs an analysis of the audio data and/or metadata associated with the audio data to determine when to generate the spatialized audio data. The system can identify one or more categories associated with the audio data (e.g., stereo, mono, game effect, . . . ) and use the category to determine whether to spatialize the audio data or not spatialize the audio data.

17 Claims, 6 Drawing Sheets

(51) Int. Cl.
  *H04S 5/00* (2006.01)
  *G11B 27/10* (2006.01)
  *H04S 3/00* (2006.01)
(52) U.S. Cl.
  CPC .......... *H04S 3/008* (2013.01); *H04S 2400/11* (2013.01); *H04S 2420/01* (2013.01)
(58) Field of Classification Search
  CPC . H04S 3/008; H04S 7/308; H04S 7/30; H04S 7/304; H04S 5/005; H04S 2420/01; G06F 3/16; G06F 3/012; G06F 3/165; G11B 27/10
  USPC .................... 381/1, 22, 23; 700/94; 704/500
  See application file for complete search history.

(56) References Cited

U.S. PATENT DOCUMENTS

| | | | |
|---|---|---|---|
| 9,179,236 B2 | 11/2015 | Robinson et al. | |
| 9,584,912 B2* | 2/2017 | Koppens | H04S 3/002 |
| 10,225,676 B2* | 3/2019 | Lando | H04R 5/02 |
| 2010/0114582 A1* | 5/2010 | Beack | G10L 19/0017 704/500 |
| 2010/0241256 A1* | 9/2010 | Goldstein | H04R 5/04 700/94 |
| 2011/0040395 A1* | 2/2011 | Kraemer | G10L 19/00 700/94 |
| 2014/0350944 A1* | 11/2014 | Jot | G10L 19/008 704/500 |
| 2014/0358567 A1 | 12/2014 | Koppens et al. | |
| 2015/0146873 A1* | 5/2015 | Chabanne | H04S 3/008 381/1 |
| 2015/0170657 A1* | 6/2015 | Thompson | G10L 19/008 704/500 |
| 2016/0064003 A1 | 3/2016 | Mehta et al. | |
| 2017/0070835 A1 | 3/2017 | Silva | |
| 2017/0098452 A1* | 4/2017 | Tracey | G10L 19/20 |

FOREIGN PATENT DOCUMENTS

| | | |
|---|---|---|
| GB | 2543275 A | 4/2017 |
| WO | 2011020067 A1 | 2/2011 |
| WO | 2015050785 A1 | 4/2015 |
| WO | 2015180866 A1 | 12/2015 |

OTHER PUBLICATIONS

"Voice input", http://web.archive.org/web/20160813091346/https://developer.microsoft.com/en-US/windows/holographic/voice_input, Published on: Aug. 13, 2016, 5 pages.
"Audio and Speech Processing", http://web.archive.org/web/20130719024918/http:/www.surrey.ac.uk/cvssp/activity/labs/i-lab/audio_and_speech_processing.htm, Published on: Jul. 19, 2013, 10 pages.
"Spatial Audio", https://www.microsoft.com/en-us/research/project/spatial-audio/, Published on: Dec. 1, 2015, 8 pages.
"Spatial Audio", https://developers.google.com/vr/concepts/spatial-audio, Published on: Oct. 10, 2016., 13 pages.
Tsigkogiannis, Ilias, "Windows 8.1 Audio streaming—Part 4: Background playback, Volume policy, Routing", https://blogs.msdn.microsoft.com/iliast/2016/01/27/windows-8-1-audio-streaming-part-4-background-playback-volume-policy-routing/, Published on: Jan. 27, 2016, 12 pages.
Buffoni, Louis-Xavier, "Working with Object-Based Audio", http://blog.audiokinetic.com/working-with-object-based-audio, Retrieved on: Oct. 19, 2016, 5 pages.
"Lync and Skype Audio Offloading of Digital Signal Processing (DSP) Effectsin Windows 8.1", http://download.microsoft.com/download/7/C/1/7C1C33EC-748A-477D-B250-6D90A0E0AA08/Lync%20and%20Skype%20Audio%20Offloading%20of%20Digital%20Signal%20Processing%20Effects%20in%20Windows%208-1.pdf, Published on: Jun. 30, 2016, 4 pages.
"International Search Report and Written Opinion Issued in PCT Application No. PCT/US2018/028769", dated Jun. 25, 2018, 14 Pages.
"Office Action Issued in European Patent Application No. 18725696.1", dated Nov. 25, 2020, 6 Pages.
"Office Action Issued in European Patent Application No. 18725696.1", dated Jan. 12, 2022, 4 Pages.

\* cited by examiner

SPATIALIZING AUDIO DATA BASED ON ANALYSIS OF INCOMING AUDIO DATA

BACKGROUND

Some software applications are configured to provide a rich sound experience and can process object-based audio to utilize one or more spatialization technologies. For instance, a video game can utilize a spatialization technology, such as DOLBY ATMOS or DTS:X, to generate a rich sound that enhances a user's experience.

Despite advancements that have occurred over the years, many existing systems are still quite limited when it comes to processing audio data. For instance, although some audio data may include spatial components, such as those components that can produce three-dimensional sound effects, the audio system may output audio data that may disregard the spatial components. In other cases, the audio system may output audio data meant to be non-spatialized as spatialized audio data. In one example scenario, if user is running a media player for playing music and running a video game that includes sound effects, the audio system may use a spatialization technology to output both the music and the sound from the game. In other cases, the audio system may spatialize both the music and the sound from the game. As such, the sound provided to the user from the audio system may be less than desirable.

It is with respect to these and other considerations that the disclosure made herein is presented.

SUMMARY

The techniques disclosed herein can enable a system to selectively spatialize audio data or not spatialize audio data based on an analysis of incoming audio data. The system can receive incoming audio data including a plurality of channel-based audio signals as well as object-based audio. The system determines when to generate spatialized audio data based on an analysis of the incoming audio data and/or metadata associated with the incoming audio data. For example, metadata associated with the incoming audio data, or an analysis of the incoming audio data, can indicate a category of the incoming audio data (e.g., stereo, mono, game effect, . . . ). The system then determines whether to generate spatialized audio data based, at least in part, on the category associated with the incoming audio data.

In a particular example, a system can determine, by an analysis of the incoming audio data, that only the left and right channels of an eight-channel audio stream are utilized. The utilization of just two channels of the eight-channel audio stream indicates that the incoming audio data is a stereo signal. Using this information, the system can determine to generate non-spatialized audio data instead of generating spatialized audio data. Existing systems would generally generate spatialized data since the incoming audio data included an eight-channel audio stream. Instead of relying on the number of channels included in the audio stream, the system analyzes the audio stream to determine the number of channels used. The system can then use the number of channels utilized in determining whether to generate spatialized audio data or generate non-spatialized data.

In addition to or alternatively to determining the number of channels utilized, the system can analyze the incoming audio data to determine the category of the audio signal. For instance, the system can analyze a portion of incoming audio data (e.g., an individual stream of the incoming audio data) and determine that the portion of the incoming audio data is music, a game effect, a chat stream, and the like.

In some examples, the incoming audio data may have metadata that provides an indication of the category of the incoming audio data. Based on the analysis of the incoming audio data (e.g., number of channels utilized and/or analysis of the audio data to identify a category,) and/or metadata associated with the incoming metadata, the system can generate a spatially encoded stream of audio data and/or a non-spatially encoded stream of audio data that appropriately renders the audio to an available output device.

In some configurations, the system can generate spatialized audio data that adjusts the locations of virtual speakers based on the orientation of a user. For example, when a user is listening to spatialized audio that includes the sound of a jet moving from the left of the user to the right of the user, the system generates spatialized audio data based on the orientation of a user. When the user changes orientation (e.g., rotates 90 degrees), the system generates spatialized audio that changes the location of the virtual speakers such that the sound still seems to move from the left of the user to the right of the user.

The techniques disclosed herein also allow a system to generate one or more tags to associate with the incoming audio data based on the analysis of the incoming audio data. For example, when a portion of the incoming audio data is determined to be a game effect, the system can generate a game effect tag for that portion of the incoming audio data. Similarly, when a portion of the incoming audio data is determined to be music, the system can generate a music tag to associate with that portion of the incoming audio data. These tags can be used by the system when determining whether to generate spatialized audio data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

The techniques disclosed herein can enable a system to spatialize audio data based on an analysis of incoming audio data. The analysis is used by the system to identify when to generate spatialized audio data and when to generate non-spatialized data. The system can receive incoming audio data that includes a plurality of channel-based audio signals as well as object-based audio data.

The system determines when to use a spatialization technology to generate spatialized audio data based on an analysis of the audio data and/or metadata that is associated with the incoming audio data. For example, metadata associated with incoming audio data, or an analysis of the incoming audio data, can indicate a category of the audio signal (e.g., stereo, mono, game effect, . . . ). The system then determines whether to generate the spatialized audio data based, at least in part, on the category associated with the incoming audio data. In some cases, the system can determine the number of utilized channels of an audio stream. For example, even though the incoming audio data may include a six-channel audio stream, only one or two of these channels may be utilized.

As a particular example, the system can determine, by an analysis of the incoming audio data, that only the left and right channels of an N-channel audio stream are utilized. The utilization of two channels indicates that the incoming audio data is a stereo signal. Using this information and possibly a further analysis of the content of the incoming audio stream to identify a category, the system can determine whether to generate spatialized audio data.

As briefly discussed, the system can analyze the incoming audio data to determine one or more categories associated with the incoming audio data. For instance, the system can analyze (or provide to another service or application) a portion of the incoming audio data and determine that the incoming audio data is music, a game effect, a chat stream, and the like. In some examples, the incoming audio data may be associated with metadata that provides an indication of the category of the incoming audio data.

According to some configurations, the system can also adjust the location of virtual speakers based on an orientation of a user, or an endpoint device, associated with a user. For example, when the user changes orientation, the virtual location of speakers can be adjusted. Based on the metadata and/or the analysis of the incoming audio data, the system can generate a spatially encoded stream of audio data and/or non-spatially encoded streams of audio data that appropriately renders the audio of multiple applications to available output devices.

In some configurations, the system can also generate one or more tags to associate with the incoming audio data based on the metadata and/or analysis of the incoming audio data. For example, when at least a portion of the incoming audio data is determined to be a game effect, the system can generate a game effect tag. Similarly, when a portion of the incoming audio data is determined to be music, the system can generate a music tag or when the audio signal is a person speaking, the system can generate a chat tag. These tags can be used by the system when determining whether to generate spatialized audio data.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a device may be improved as the use of the techniques disclosed herein enable a user to hear audio generated audio signals as they are intended. In addition, improved human interaction improves other computing resources such as processor and network resources. Other technical effects other than those mentioned herein can also be realized from implementations of the technologies disclosed herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for enabling spatializing audio data based on an analysis of incoming audio data. As will be described in more detail below with respect to FIG. 5, there are a number of applications and modules that can embody the functionality and techniques described herein.

Figure 1:
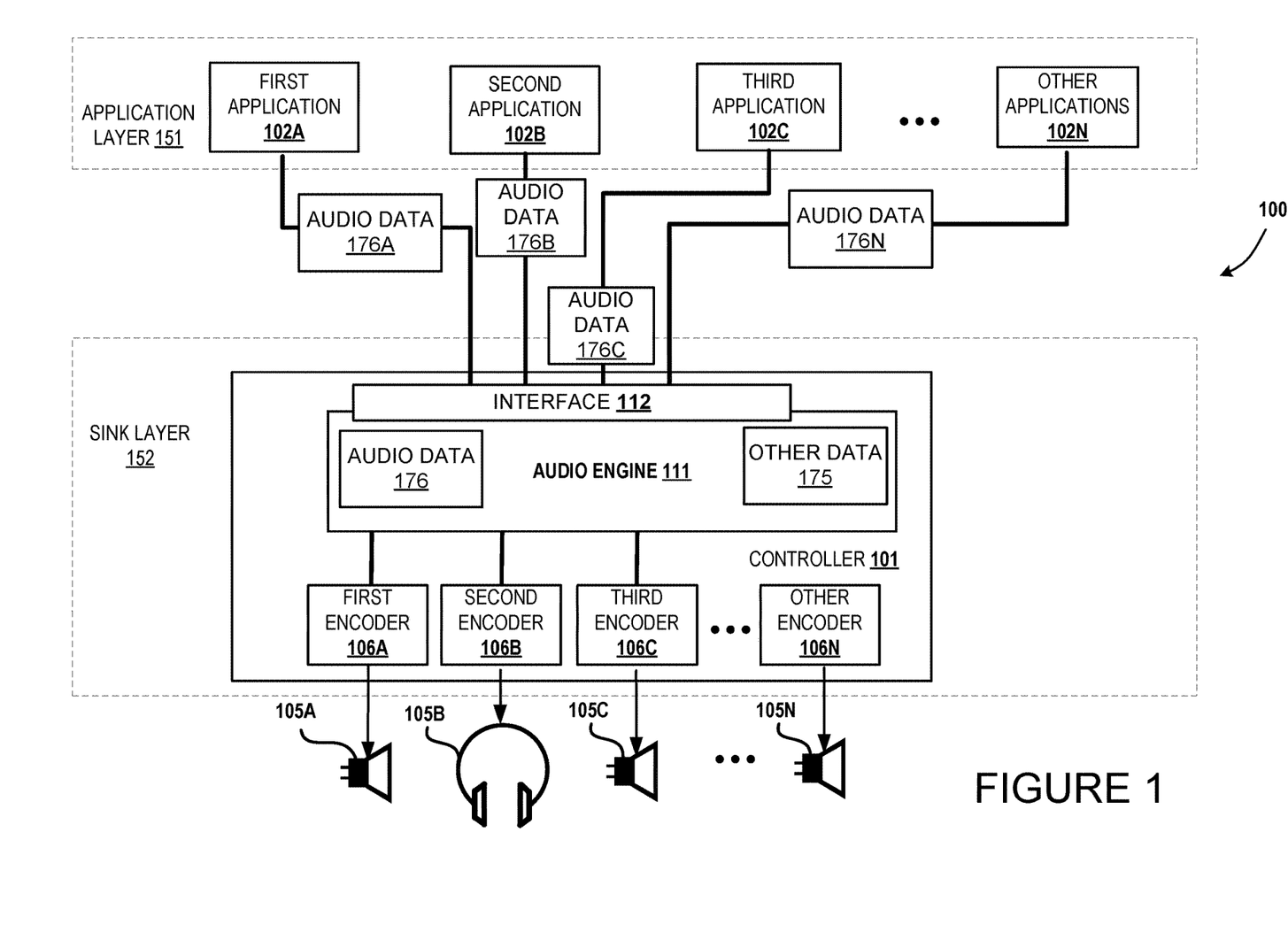
FIG. 1 illustrates an example system for spatializing audio data based on an analysis of incoming audio data.

FIG. 1 is an illustrative example of a system 100 configured to spatialize audio data based on analysis of incoming audio data. The system 100 comprises a controller 101 executing at a sink layer 152 for storing, generating, communicating, and processing the audio data described herein. The controller 101 comprises an audio engine 111 configured to generate spatialized data based on an analysis of incoming audio data received from a plurality of applications. The audio engine 111 is configured to receive input signals, e.g., incoming audio data 176A-N (which may be referred to herein as "incoming audio data 176") from one or more applications 102A-102N (which may be referred to herein as "applications 102"). The audio engine 111 can also be configured to analyze the incoming audio data 176A-D, determine whether to generate spatialized audio data, and cause the generation of spatialized audio data and/or non-spatialized audio data. In some examples, the audio engine 111 can specify to the one or more encoders 106A-106N (which may be referred to herein as "encoders 106") to generate spatialized audio data (e.g., the audio data is processed according to a spatialization technology, e.g., Dolby Atmos, HRTF, etc.) or not to generate spatialized audio data. The spatialized audio data and/or the non-spatialized audio data can be rendered to one or more of the output devices 105A-105N (which may be referred to herein as "output devices 105").

As discussed above, the audio engine 111 can receive incoming audio data 176A-176N that includes a plurality of channel-based audio signals as well as object-based audio. The audio engine 111 determines when to generate spatialized audio data based on an analysis of the incoming audio data 176 and/or metadata associated with the incoming audio data. For example, the audio engine 111 may identify that metadata that is associated with at least a portion of the incoming audio data identifies a category of the incoming audio data (e.g., stereo, mono, game effect, chat, . . . ). The audio engine 111 can also perform or cause to be performed an analysis of at least a portion of the incoming audio data to identify one or more categories associated with the incoming audio data. In some configurations, the audio engine 111 may provide the incoming audio data 176 to another component, application, and/or service (e.g., a web service) that identifies the category of the incoming audio data. For example, the service may identify that one stream of the incoming audio data is chat between users, and another two streams is music. In another example, the service may identify that at least a portion of the incoming audio data 176 includes game effects. In other configurations, the audio engine 111 can include functionality to perform an analysis of the incoming audio data 176. For example, the audio engine 111 can compare portions of the incoming audio data 176 to acoustic fingerprints stored within a data store that is accessible to the audio engine 111. Other analysis methods can be utilized. For example, the audio engine 111, or some other device or component can analyze the frequency and amplitude of portions of the incoming audio data 176 to identify a category. The audio engine 11 then determines whether to generate spatialized audio data or not generate spatialized data based, at least in part, on the category associated with the incoming audio data.

As a particular example, the audio engine 111 can determine, by an analysis of the incoming audio data 176, that only a single channel of a six channel audio stream is utilized. The utilization of just one channel provides an indication that the incoming audio data is a mono signal. In addition to using the number of utilized channels, the audio engine 111 can analyze the content of the single channel to determine if the sound is a game effect (e.g., indicating that even though a single channel is used, the game effect is to be spatialized) or some other type of sound (e.g., speech that is not to be spatialized). Using this information, the audio engine 111 can determine whether to generate spatialized audio data. As discussed above, existing systems may rely on the number of channels included in the audio stream to determine when to spatialize the incoming audio data 176.

In some examples, the incoming audio data may have metadata that provides an indication of the category of the incoming audio data. Based on the analysis of the incoming audio data (e.g., number of channels utilized and/or analysis of the audio data to identify a category,) and/or metadata associated with the incoming metadata, the audio engine 111 can generate a spatially encoded stream of audio data and/or a non-spatially encoded stream of audio data that appropriately renders the audio to an available output device 105.

In some configurations, the audio engine 111 can cause spatialized audio data to be generated that adjusts the locations of virtual speakers based on the orientation of a user. For example, when a user is listening to spatialized audio that includes the sound of a jet moving from the left of the user to the right of the user, the system generates spatialized audio data based on the orientation of a user. When the user changes orientation (e.g., rotates 90 degrees), the system generates spatialized audio that changes the location of the virtual speakers such that the sound still seems to move from the left of the user to the right of the user.

The audio engine 111 can also generate one or more tags to associate with the incoming audio data based on the analysis of the incoming audio data. These tags may be stored with the audio data 176, the other data 175, or at some other location. For example, when a portion of the incoming audio data is determined to be a game effect, the system can generate a game effect tag for that portion of the incoming audio data. Similarly, when a portion of the incoming audio data is determined to be music, the system can generate a music tag to associate with that portion of the incoming audio data. These tags can be used by the system when determining whether to generate spatialized audio data.

In some configurations, the audio engine 111 can utilize other data 175 in generating spatialized audio data and/or non-spatialized audio data. For example, the other data 175 can include bed metadata that defines the configuration of a 3D bed. In general, a 3D bed can comprise a number of speakers, which are also referred to herein as speaker objects. A 3D bed can model an arrangement of speakers, and the model can involve actual speakers and/or virtual speakers. In one example, the bed metadata 175 can define a number of speaker objects for a 3D bed and provide specific three-dimensional coordinates for each speaker object. For example, the bed metadata 175 can indicate that a front-center speaker has a specific location, e.g., (X, Y, Z) coordinates of a three-dimensional area. Other speaker objects of the 3D bed can be associated with a location in a same manner. Any suitable coordinates system, or any other suitable data format for defining a location of an object in a three-dimensional area, can be utilized with the techniques disclosed herein. In another example, the location of a particular speaker object may be based on vector data.

The other data 175 can also define properties with respect to each speaker object. For example, the other data 175 can indicate that a speaker object is configured to function according to a particular shape or pattern, e.g., omnidirectional, bidirectional, cardioid, parabolic, shotgun, etc. The other data 175 can also indicate, among other attributes, a direction of a speaker object.

The audio engine 111 can be configured with an interface 112 for receiving audio data 176 from any number (N) of applications 102 executing at an application layer 151. For illustrative purposes, some example applications 102 are individually referred to herein as a first application 102A, a second application 102B, and a third application 102C and other applications 102N. Individual applications 102 can also comprise one or more preprocessors for executing code configured to perform the techniques disclosed herein.

The applications 102 can comprise any executable code configured to process object-based audio (also referred to herein as "3D bed audio" and "3D object audio") and/or channel-based audio (also referred to herein as "2D bed audio"). Examples of the applications 102 can include but, are not limited to, a media player, a web browser, a video game, a virtual reality application, and a communications application. The applications 102 can also include components of an operating system that generate system sounds.

In addition to providing functionality for interacting with a user, the applications 102 can apply one or more operations to object-based audio, including, but not limited to, one or more folding operations and co-location operations, which can involve combining multiple objects into a single object. In another example, the applications 102 can utilize one or more culling operations, which can involve the elimination of one or more selected audio objects.

The applications 102 can generate different types of audio data, such as but not limited to 3D audio data, or 2D audio data. In one illustrative example, if the first application 102A is a video game generating raw object-based audio data having 300 audio objects, and the other data 175 defines a 3D bed having 10 speakers at specific locations of a three-dimensional area, the application 102A can process the 300 audio objects, e.g. fold, co-locate, and/or filter the objects, to appropriately associate individual or combined audio streams of the raw audio data with the 10 speakers and their respective locations. In some examples, the audio engine 111 can generate spatialized audio data that changes a location of one or more virtual speakers based on an orientation of a user or an endpoint device 105 associated with the user. For example, the audio engine 111 can receive data from headphones 105 (or from some other device or system) that indicates an orientation of the headphones. The audio engine 111 can instruct one or more of the encoders to generate spatialized audio data.

The controller 101 can comprise a suitable number (N) of encoders 106. For illustrative purposes, some example encoders 106 are individually referred to herein as a first encoder 106A, a second encoder 106B, and a third encoder 106C. The encoders 106 can be associated with a suitable number (N) of output devices 105. For illustrative purposes, some example output devices 105 are individually referred to herein as a first output device 105A, a second output device 105B, a third output device 105C. This example system 100 is provided for illustrative purposes and is not to be construed as limiting. It can be appreciated that the system 100 can include fewer or more components than those shown in FIG. 1.

The encoders 106 are configured to process channel-based audio and object-based audio according to one or more technologies. One or more of the encoders can generate spatialized audio data. A rendered stream generated by an encoder 106 can be communicated to one or more output devices 105. Examples of an output device 105, also referred to herein as an "endpoint device," include, but are not limited to, speaker systems and headphones. An encoder 106 and/or an output device 105 can be configured to utilize one or more spatialization technologies such as Dolby Atmos, HRTF, etc.

The encoders 106 can also implement other functionality, such as one or more echo cancellation technologies. Such technologies are beneficial to select and utilize outside of the application environment, as individual applications do not have any context of other applications, thus can't determine when echo cancellation and other like technologies should be utilized.

The techniques disclosed herein also enable different spatialization technologies to be utilized. For example, the system 100 may render audio under one or more spatialization technologies, such as Dolby Atmos, HRTF, and the like. Thus, the system can transition between different spatialization technologies.

Figure 2A:
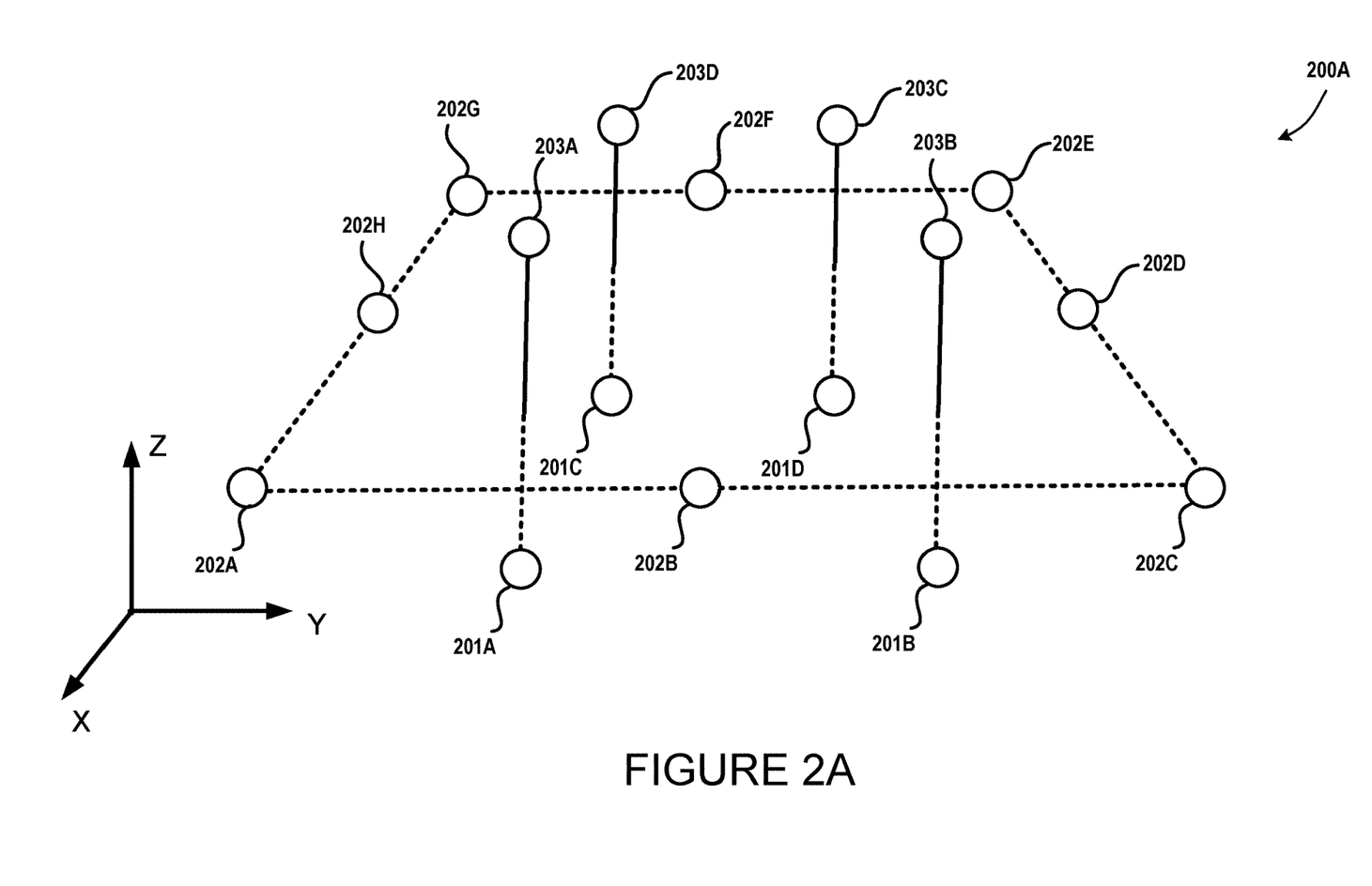
FIG. 2A illustrates a representation of a 3D audio bed.
Figure 2B:
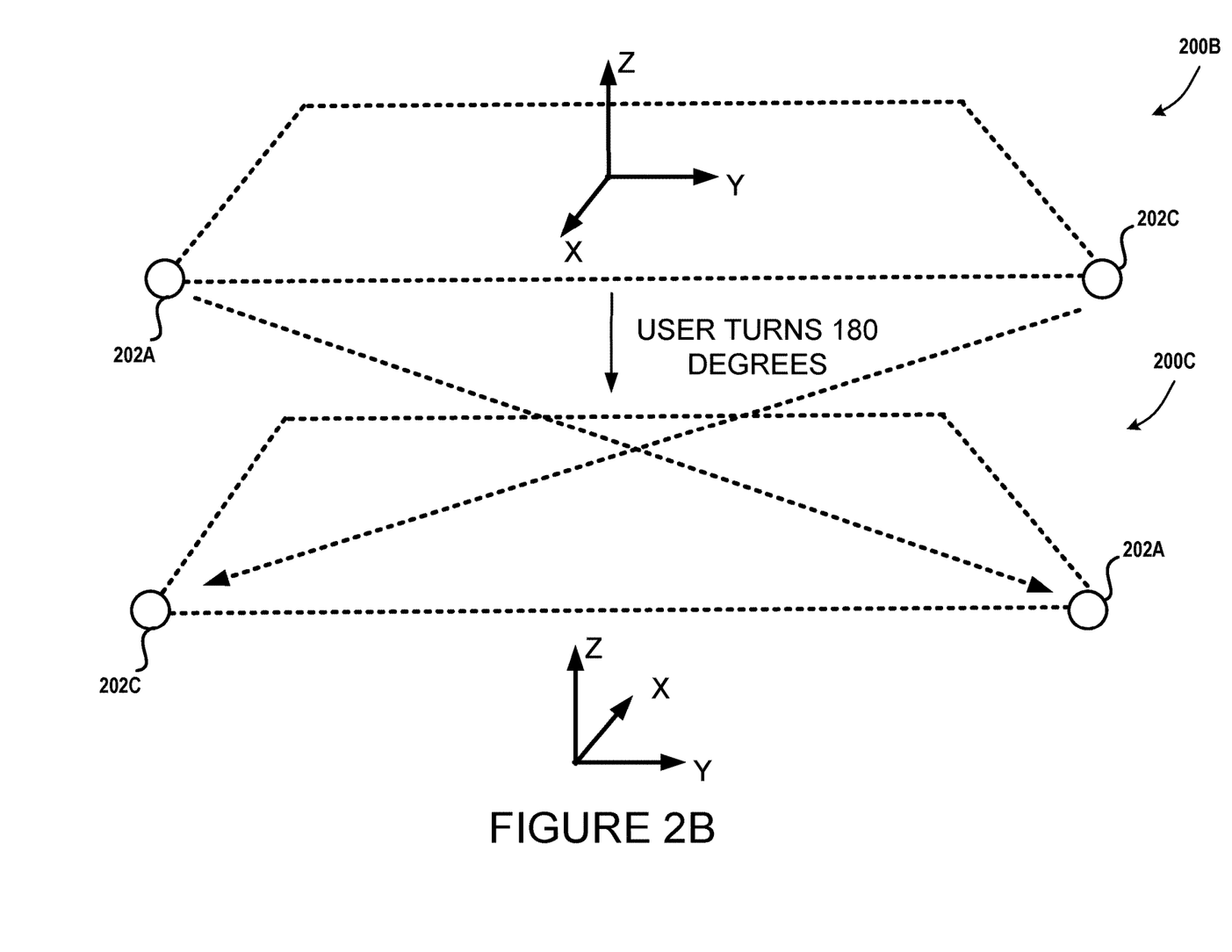
FIG. 2B illustrates adjusting a location of virtual speakers in response to an orientation change of a user.

Referring now to FIGS. 2A-2B, illustrations showing an example 3D audio bed and changing the location of virtual speakers in response to an orientation change are shown and described below. FIG. 2A illustrates a 3D audio bed 200A having a plurality of speaker objects 201-203. Each speaker object is associated with a particular location within a three-dimensional area. For example, a particular speaker object can have a location designated by an X, Y and Z value. In this example, the first 3D audio bed 200A comprises a number of speaker objects 202A-202H positioned around a perimeter of a plane. In this example, the first speaker object 202A is a front-right speaker object, the second speaker object 202B is the front-center speaker, and the third speaker object 202C is the front-left speaker. The other speaker objects 202D-202H include surrounding speaker locations within the plane. The 3D audio bed 200A also comprises a number speakers 201A-201D positioned below plane, and a number of speakers 203A-203D positioned above the plane.

The audio engine 111 is configured to receive incoming audio data from one or more applications 102. The audio data can include audio streams "signals" associated with individual speaker positions. The other data 175 can be used to define attributes associated with each speaker object 201-203 including a location for each speaker object, a shape for each speaker object, a direction for each speaker object, etc. The other data 175 can be used by the audio engine 111 and/or one or more of the applications 102 to associate audio streams with each speaker object. For example, an application and/or a preprocessor can associate one or more object-based audio tracks with one or more speaker objects of the 3D audio bed 200A. The associations can be made using a number of different technologies.

As summarized above, the system 100 can generate spatialized data for some portion of the incoming audio data 176 and not generate spatialized data for other portions of the incoming audio data 176. For instance, the audio engine 111 can perform an analysis of the incoming audio data to determine that the incoming audio data is a game effect that is to be spatialized. The examples disclosed herein are provided for illustrative purposes and are not to be construed as limiting. It can be appreciated that different systems can determine parameters for when to generate spatialized audio data based on an analysis of the incoming audio data.

FIG. 2B illustrates adjusting a location of virtual speakers in response to an orientation change of a user. The example of FIG. 2B shows two speaker objects 202A and 202B, but the number of speakers is not limited. For instance, the number of speakers can be the same as illustrated in FIG. 2A, or some other number of speaker objects.

As described above, the system 100 can identify when an orientation of a user, or a device associated with a user (e.g., headphones) has changed. For instance, the orientation can be determined from one or more sensors associated with the device and/or a user. In some configurations, one or more cameras can identify an orientation of a user relative to a fixed location. In other configurations, one or more sensors attached to the user can determine a change in orientation of the user. As an example, a user may be listening to spatialized audio data that includes a sound of an airplane moving from the left of the user to the right of the user. If the user was to move without the system 101 adjusting for the user's movement as indicated by the orientation change, the sound would appear to move from right to left instead of left to right. Using the technologies described herein, the audio engine 111 can determine that the incoming audio data includes information that identifies where particular sounds originate from and transforms the information based on the change of orientation of the user. In the current example, the audio engine 111 identifies that a user wearing headphones 105B has turned 180 degrees. In response, the audio engine 111 generates spatialized audio data 176 to compensate for the user turning 180 degrees. In the current example, the audio engine 111 generates spatialized audio data that switches the locations of speaker objects 202A and 202C. Previous to the use of the technologies described herein, many systems would not even attempt to have the sound move from one speaker to another.

Figure 3:
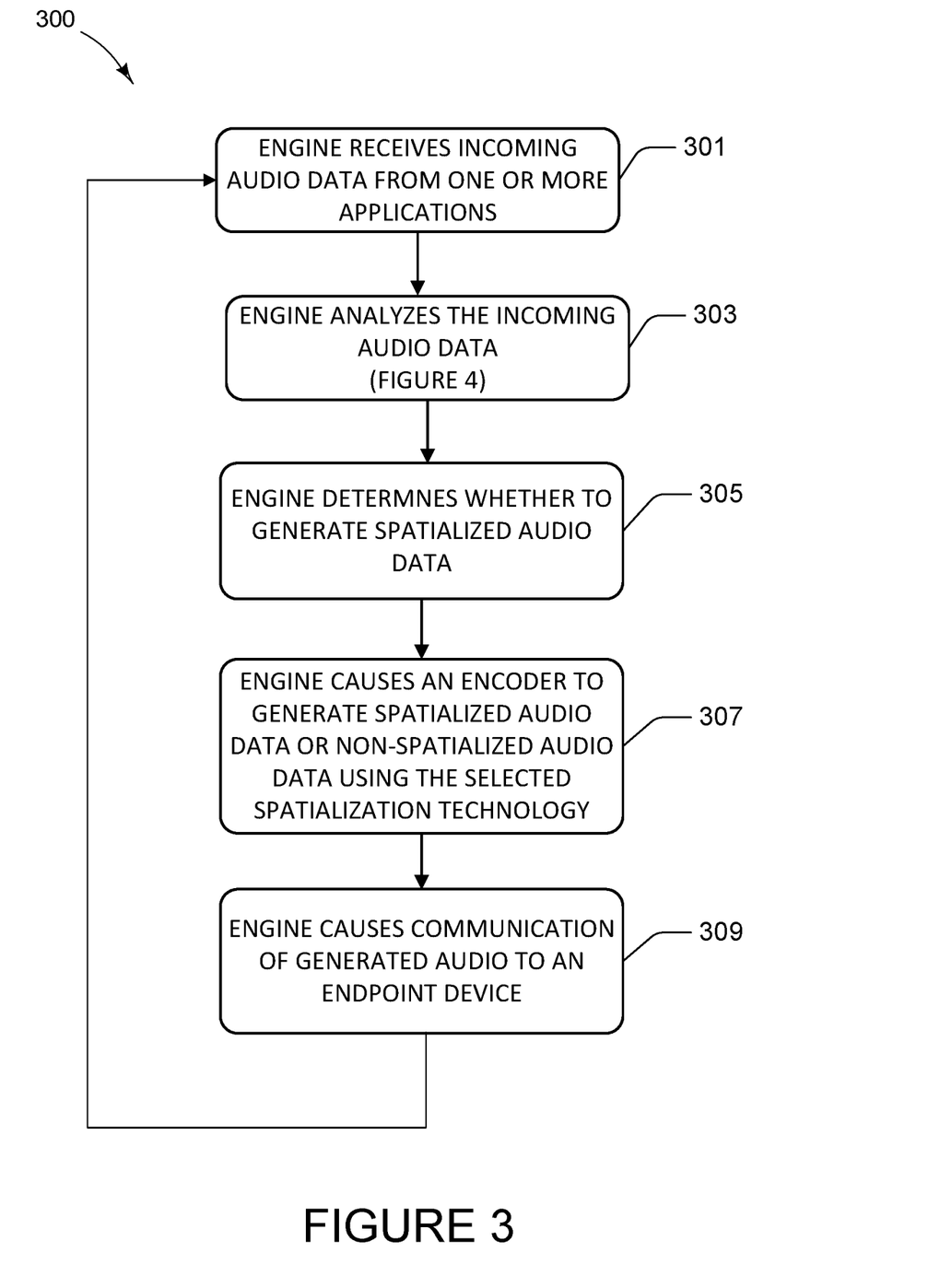
FIG. 3 illustrates a flow diagram of a routine for spatializing audio data based on an analysis of incoming audio data.
Figure 4:
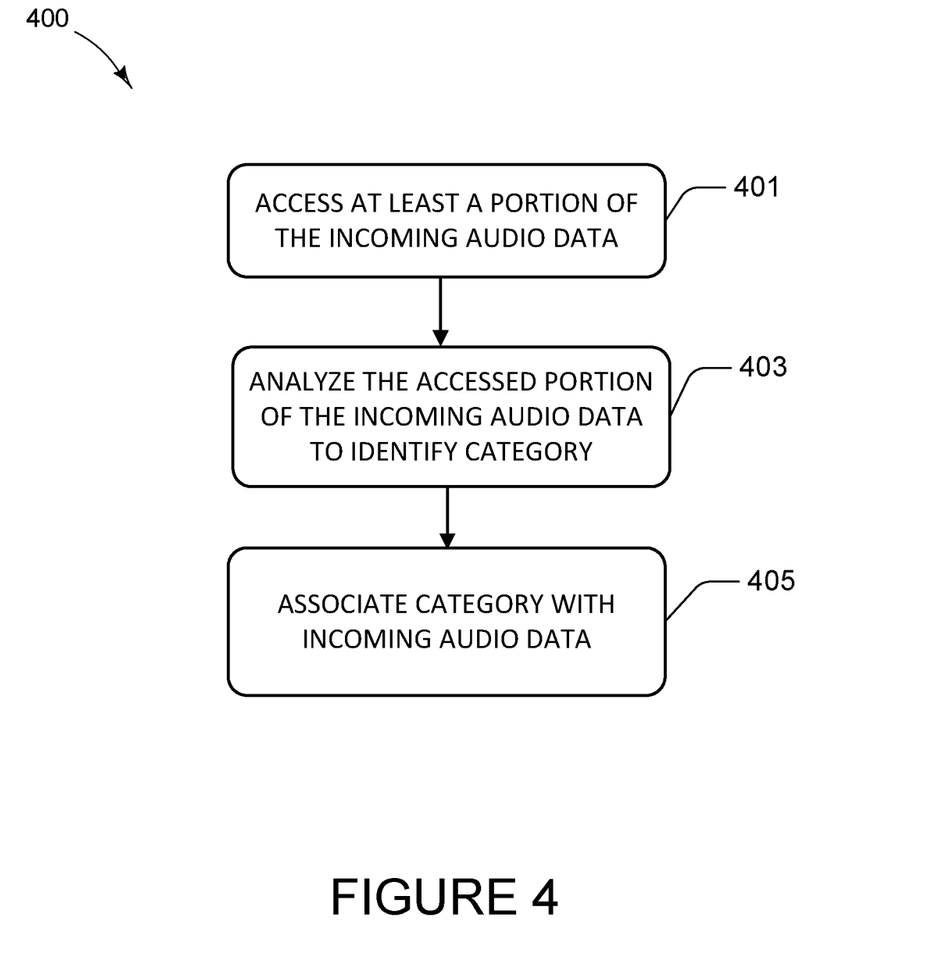
FIG. 4 illustrates a flow diagram of a routine for analyzing the incoming audio data.

Turning now to FIGS. 3 and 4, aspects of routines 300 and 400 for enabling spatializing of audio data based on an analysis of the incoming audio data are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routines 300 and 400 are described herein as being implemented, at least in part, by an application, component and/or circuit, such as the audio engine 111. In some configurations, the audio engine 111 can be a dynamically linked library (DLL), a statically linked library, functionality produced by an application programming interface (API), a compiled program, an interpreted program, a script or any other executable set of instructions. Data and/or modules, audio engine 111, can be stored in a data structure in one or more memory components. Data can be retrieved from the data structure by addressing links or references to the data structure.

Figure 5:
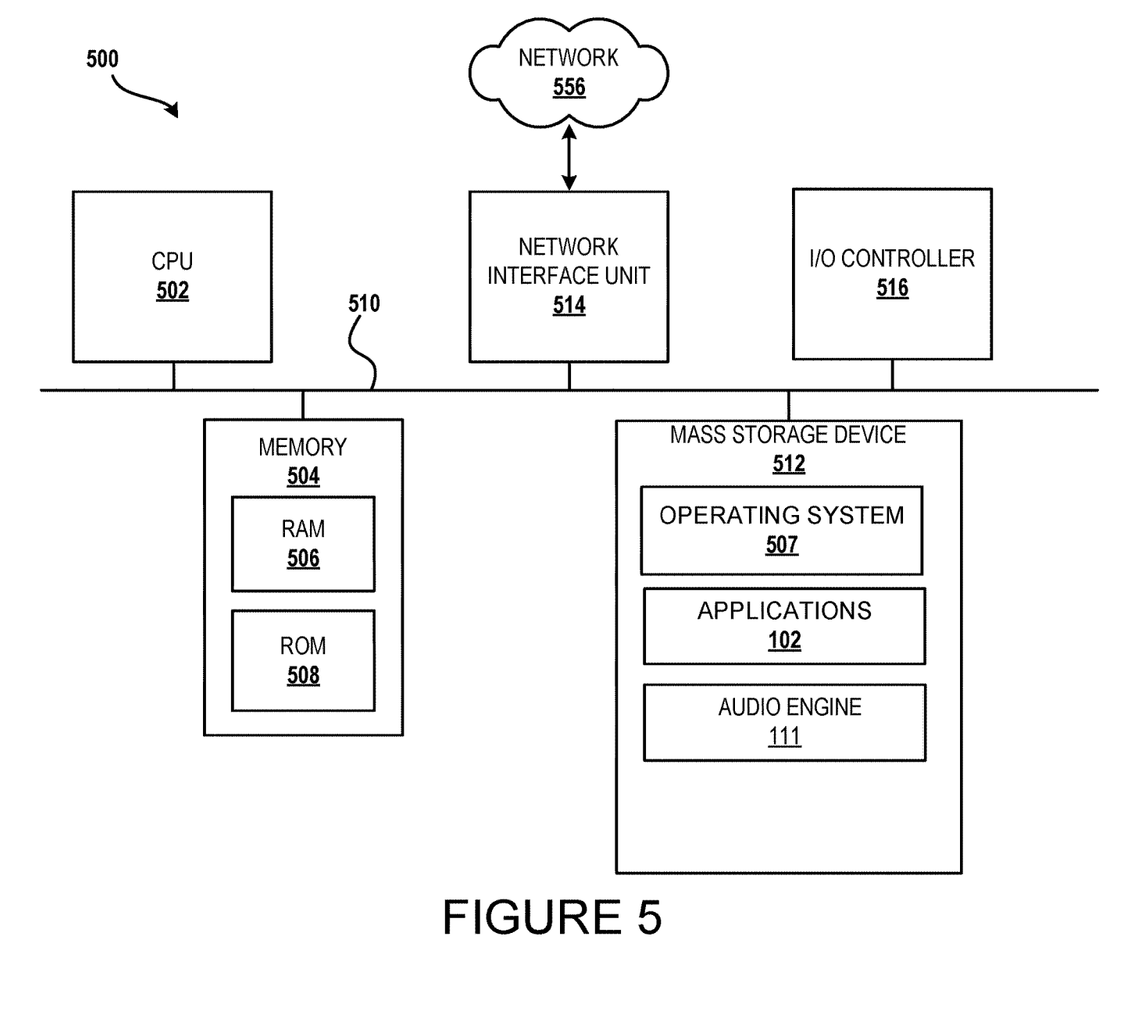
FIG. 5 is a computer architecture diagram illustrating an illustrative computer hardware and software architecture for a computing system capable of implementing aspects of the techniques and technologies presented herein.

Although the following illustration refers to the components of FIG. 1 and FIG. 5, it can be appreciated that the operations of the routines 300 and 400 may be also implemented in many other ways. For example, the routines 300 and 400 may be implemented, at least in part, by a processor of another remote computer or a local circuit. In addition, one or more of the operations of the routines 300 and 400 may alternatively or additionally be implemented, at least in part, by a chipset working alone or in conjunction with other software modules. Any service, circuit or application suitable for providing the techniques disclosed herein can be used in operations described herein.

With reference to FIG. 3, the routine 300 begins at operation 301, where audio engine 111 receives incoming audio data 176 from one or more applications 102. As summarized above, one or more applications 102 can provide audio data 176 to the audio engine 111. The audio data 176 may include channel-based audio signals as well as object-based audio data.

At operation 303, the audio engine 111 analyzes the incoming audio data 176. Generally, as described above, and below with reference to FIG. 4, the audio engine 111 analyzes at least a portion of the audio data to identify the number of channels utilized, and/or a category of the audio data. For example, the audio engine 111 may determine that a portion of the audio data is a game effect, another portion is music, and another portion is people speaking. In some examples, the audio engine can utilize metadata in addition to the analysis of the incoming audio data 176 to identify one or more categories associated with the incoming audio data 176.

At operation 305, the audio engine 111 determines whether to generate spatialized audio data. As described above, the audio engine 111 can utilize the analysis of the incoming audio data 176 to determine whether to generate spatialized audio data. For example, the audio engine 111 can determine to generate spatialized data for the portion of the incoming audio data 176 that is a game effect that is provided to a sound system including a plurality of speakers, and non-spatialized data for music and chat that is delivered to a user's headphones.

At operation 307, the audio engine 111 causes one or more encoders to generate spatialized audio data and/or non-spatialized audio data. In some configurations, the audio engine 111 can select a spatialization technology based on the capabilities of an encoder or an output device. For instance, if an encoder is configured to accommodate the Dolby Atmos spatialization technology, the resource manager can select the Dolby Atmos spatialization technology. In some examples, the spatialization technology can be selected based on one or more preferences. For instance, a user can indicate a preference for utilizing headphones over a speaker system when the headphones are available. If the headphones are configured to accommodate a particular spatialization technology, such as HRTF, and the headphones are plugged into the system 100, that particular spatialization technology can be selected. These examples are provided for illustrative purposes and are not to be construed as limiting.

Next, at operation 309, the engine 111 causes the communication of the generated audio to an endpoint device. For example, the audio can be communicated to a speaker system or headphones. In operation 309, the audio engine 111 can also combine 2D audio with the rendered audio. The communication of the rendered output signal from the encoder to one or more endpoint devices produces producing an audio output of the individual audio streams. The endpoint devices produce an audio output (an audible waveform) of the individual audio streams, wherein the audio output, e.g., the actual sound content, of the individual audio streams emanate from the locations of the individual speaker objects associated with the individual audio streams. In configurations where an endpoint device includes a physical speaker as an output for a speaker object, the audio output of the audio streams associated with that speaker object emanates from the physical speaker. In configurations where a speaker object is associated with a virtual speaker having an associated location, the audio output of the audio streams associated with that speaker object sounds as if it is emanating from the location of the virtual speaker. For illustrative purposes, an audio output of the individual audio streams emanating from the locations of the individual speaker objects means an audio output emanating from a physical speaker or an audio output that is configured to simulate an output emanating from a virtual speaker.

With reference to FIG. 4, the routine 400 begins at operation 401, where the audio engine 111 accesses at least a portion of the incoming audio data 176 received from one or more of the applications 102.

At operation 403, the audio engine 111 analyzes the audio data to identify a category. As described above, the audio engine 111 may identify the category of the data based on how many channels are utilized by the audio stream and/or identify a category based on an analysis of at least a portion of the audio data. For example, the audio engine 111 can provide the portion of the audio data to another application or web service, to perform the analysis and identify the category of the audio data. As discussed above, the audio engine 111 may identify that incoming audio data 176 is associated with a plurality of categories.

At operation 405, the audio engine 111 associates the identified category with the audio data. In some example, the audio engine 111 can "tag" the audio stream with the category. For example, the "tag" may indicate that the audio stream is a game effect, music, conversation, and the like.

FIG. 5 shows additional details of an example computer architecture 500 for a computer, such as the computing device 101 (FIG. 1), capable of executing the program components described herein. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, one or more applications 102, the audio engine 111, and other data and/or modules.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device, comprising:
   a processor;
   a computer-readable storage medium in communication with the processor, the computer-readable storage medium having computer-executable instructions stored thereupon which, when executed by the processor, cause the processor to:
   receive audio data from one or more applications;
   analyze, by an audio engine associated with the computing device, the audio data to identify one or more categories associated with an individual stream of the audio data;
   determine when the individual stream of the audio data is to be spatialized, based, at least in part, on the one or more categories associated with the individual stream of the audio data, the one or more categories comprising at least one of a sound effect data category, a music data category, and a chat data category, the one or more categories generated from analysis of frequency and amplitude portions associated with the individual stream or comparison of one or more portions of the individual stream to one or more stored acoustic fingerprints;
   generate spatialized audio data from at least a first stream of the audio data associated with at least the sound effect category, wherein the spatialized audio data includes individual audio objects that defines one or more locations corresponding to one or more virtual speakers within a three-dimensional area of an audio bed;
   generate non-spatialized audio data from at least a second stream of the audio data associated with at least one of the music data category or the chat data category, wherein the non-spatialized audio data does not include audio objects that define a location corresponding to a virtual speaker within the three-dimensional area of the audio bed; and
   detect a change of an orientation of an endpoint device and wherein generating the spatialized audio data comprises adjusting a location of one or more virtualized speakers based at least in part on the change of the orientation of the endpoint device.

2. The computing device of claim 1, wherein the computer executable instructions further cause the processor to identify a number of channels associated with the audio data, and wherein determine when the individual stream of the audio data is to be spatialized, is based, at least in part, on the number of channels utilized.

3. The computing device of claim 1, wherein analyze the audio data to identify the one or more categories includes identifying that the individual stream of the audio data includes one or more of the game effect data, the music data, or the chat data.

4. The computing device of claim 1, wherein the computer executable instructions further cause the processor to generate one or more tags for the audio data, the one or more tags indicating at least one category that is associated with the audio data.

5. The computing device of claim 1, wherein the computer executable instructions further cause the processor to identify a plurality of endpoint devices, and wherein determine when the individual stream of the audio data is to be spatialized is based, at least in part, on the plurality of endpoint devices.

6. A computer-implemented method, comprising:
   receiving audio data from one or more applications;
   analyzing, by an audio engine associated with at least one computing device to execute the method, the audio data to identify a category associated with at least a first portion of the audio data, the category generated from analysis of frequency and amplitude portions associated with the audio data or comparison of one or more portions of the audio data to one or more stored acoustic fingerprints;
   determining when to generate spatialized audio data for the at least the first portion of the audio data, based, at least in part, on the analysis of the audio data;
   generating the spatialized audio data associated with at least a sound effect category from at least the first stream of the audio data, wherein the spatialized audio data includes individual audio objects that defines one or more locations corresponding to one or more virtual speakers within a three-dimensional area of an audio bed;
   generating non-spatialized audio data from at least a second stream of the audio data associated with at least one of a music data category or a chat data category, wherein the non-spatialized audio data does not include audio objects that define a location corresponding to a virtual speaker within the three-dimensional area of the audio bed; and detecting a change of an orientation of an endpoint device and wherein generating the spatialized audio data comprises adjusting a location of one or more virtualized speakers based at least in part on the change of the orientation of the endpoint device.

7. The computer-implemented method of claim 6, wherein analyzing the audio data comprises identifying a number of channels associated with the audio data, and wherein determining when to generate spatialized data is based, at least in part, on the number of channels.

8. The computer-implemented method of claim 6, wherein analyzing the audio data includes identifying that an individual stream of the audio data includes one or more of a game effect data, a music data, or a chat data.

9. The computer-implemented method of claim 6, further comprising generating one or more tags for the audio data, the one or more tags indicating at least one category that is associated with the audio data.

10. The computer-implemented method of claim 6, further comprising identifying a plurality of endpoint devices, and wherein determining when to generate the spatialized audio data is based, at least in part, on the plurality of endpoint devices.

11. A computer-readable storage medium having computer-executable instructions stored thereupon which, when executed by one or more processors of a computing device, cause the one or more processors of the computing device to:
receive audio data from one or more applications;
analyze, by an audio engine associated with the computing device, the audio data to determine when to generate spatialized audio data for at least a first portion of the audio data, wherein the analysis includes one or more of accessing metadata associated with the audio data or performing a programmatic analysis of at least the first portion of the audio data;
based on at least the analysis of the audio data, associate one or more categories with the audio data, the one or more categories generated from analysis of frequency and amplitude portions associated with a stream of the audio data or comparison of one or more portions of the stream to one or more stored acoustic fingerprints;
generate the spatialized audio data associated with at least a sound effect category from at least the first stream of the audio data, wherein the spatialized audio data includes individual audio objects that defines one or more locations corresponding to one or more virtual speakers within a three-dimensional area of an audio bed;
generate non-spatialized audio data from at least a second stream of the audio data associated with at least one of a music data category or a chat data category, wherein the non-spatialized audio data does not include audio objects that define a location corresponding to a virtual speaker within the three-dimensional area of the audio bed;
provide the spatialized audio data and the non-spatialized audio data to at least one endpoint device; and
detect a change of an orientation of an endpoint device and wherein generating the spatialized audio data comprises adjusting a location of one or more virtualized speakers based at least in part on the change of the orientation of the endpoint device.

12. The computer-readable storage medium of claim 11, wherein analyzing the audio data to determine when to generate spatialized audio data for the at least the first portion of the audio data comprises identifying a number of channels associated with the first portion of the audio data.

13. The computing device of claim 1, wherein the non-spatialized audio data is not associated with any audio objects.

14. The computing device of claim 1, wherein the audio data comprises channel-based audio and object-based audio, wherein the generation of the non-spatialized audio data comprises converting the object-based audio of the audio data to a non-spatialized audio data format.

15. The computing device of claim 1, wherein the audio data comprises channel-based audio and object-based audio, wherein the generation of the spatialized audio data comprises converting the channel-based audio of the audio data to a spatialized audio data format.

16. The computing device of claim 1, wherein the non-spatialized audio data does not include data defining spatialized audio data.

17. The computing device of claim 1, wherein the computing device excludes data defining spatialized audio data from the non-spatialized audio data.

* * * * *